US009898091B2

(12) United States Patent
Bristol et al.

(10) Patent No.: US 9,898,091 B2
(45) Date of Patent: *Feb. 20, 2018

(54) VIRTUAL REALITY SYSTEM WITH HEAD-MOUNTED DISPLAY, CAMERA AND HAND-HELD CONTROLLERS

(71) Applicant: OCULUS VR, LLC, Menlo Park, CA (US)

(72) Inventors: Peter Wesley Bristol, Seattle, WA (US); Yi-yaun Chen, Seattle, WA (US); Jason Andrew Higgins, Seattle, WA (US); Benjamin E. Tunberg Rogoza, Seattle, WA (US); Sharvil Shailesh Talati, Seattle, WA (US); Neil Warren Konzen, Hunts Point, WA (US); James S. Webb, Seattle, WA (US)

(73) Assignee: Oculus VR, LLC, Menlo Park, CA (US)

( * ) Notice: Subject to any disclaimer, the term of this patent is extended or adjusted under 35 U.S.C. 154(b) by 341 days.

This patent is subject to a terminal disclaimer.

(21) Appl. No.: 14/729,954

(22) Filed: Jun. 3, 2015

(65) Prior Publication Data

US 2016/0357261 A1 Dec. 8, 2016

(51) Int. Cl.
*G06F 3/01* (2006.01)
*G02B 27/01* (2006.01)
(Continued)

(52) U.S. Cl.
CPC .............. *G06F 3/017* (2013.01); *A63F 13/00* (2013.01); *A63F 13/212* (2014.09);
(Continued)

(58) Field of Classification Search
CPC ........ G06F 3/017; G06F 3/014; G06F 3/0219; G02B 27/017; G02B 2027/0187; G02B 2027/0178; G02B 2027/0138; A63F 13/24; A63F 13/212; A63F 13/214; A63F 13/213; A63F 13/00
See application file for complete search history.

(56) References Cited

U.S. PATENT DOCUMENTS 4,518,164 A 5/1985 Hayford, Jr.
4,552,360 A 11/1985 Bromley et al.
(Continued)

OTHER PUBLICATIONS

Allin, Office Action, U.S. Appl. No. 14/850,821, dated Oct. 13, 2016, 15 pgs.
(Continued)

*Primary Examiner* — Andrew Sasinowski
(74) *Attorney, Agent, or Firm* — Morgan, Lewis & Bockius LLP

(57) ABSTRACT

A virtual-reality system includes a head-mounted display (HMD), a forward-looking camera coupled to the HMD and a hand-held controller communicatively coupleable to the HMD. The hand-held controller includes a first user-input key, a grip, and an outward-facing surface coupled to the grip. The outward-facing surface includes a plurality of illumination sources which provide light that is detectable by the camera for sensing a position of the controller based on a user motion.

20 Claims, 7 Drawing Sheets

(51) Int. Cl.
*G06F 3/02* (2006.01)
*G06T 19/00* (2011.01)
*A63F 13/00* (2014.01)
*A63F 13/24* (2014.01)
*A63F 13/213* (2014.01)
*A63F 13/212* (2014.01)
*A63F 13/214* (2014.01)

(52) U.S. Cl.
CPC .......... *A63F 13/213* (2014.09); *A63F 13/214* (2014.09); *A63F 13/24* (2014.09); *G02B 27/017* (2013.01); *G06F 3/014* (2013.01); *G06F 3/0219* (2013.01); *G02B 2027/0138* (2013.01); *G02B 2027/0178* (2013.01); *G02B 2027/0187* (2013.01)

(56) References Cited

U.S. PATENT DOCUMENTS

| | | |
|---|---|---|
| 5,008,497 A | 4/1991 | Asher |
| 5,159,159 A | 10/1992 | Asher |
| 5,409,239 A | 4/1995 | Tremmel |
| 5,421,590 A | 6/1995 | Robbins |
| 5,479,163 A | 12/1995 | Samulewicz |
| 5,551,701 A | 9/1996 | Bouton et al. |
| 5,616,078 A | 4/1997 | Oh |
| 5,632,679 A | 5/1997 | Tremmel |
| 5,645,277 A | 7/1997 | Cheng |
| 5,855,483 A | 1/1999 | Collins et al. |
| 6,297,811 B1 | 10/2001 | Kent et al. |
| 6,572,108 B1 | 6/2003 | Bristow |
| 6,652,383 B1 | 11/2003 | Sonoda et al. |
| 6,659,870 B2 | 12/2003 | Sobota |
| 6,661,239 B1 | 12/2003 | Ozick |
| 6,811,491 B1 | 11/2004 | Levenberg et al. |
| 6,909,354 B2 | 6/2005 | Baker et al. |
| 7,331,793 B2 | 2/2008 | Hernandez et al. |
| 8,267,786 B2 | 9/2012 | Ikeda |
| 8,439,753 B2 | 5/2013 | Wakitani et al. |
| 8,496,528 B2 | 7/2013 | Muramatsu |
| 8,823,399 B1 | 9/2014 | Bharathan |
| 8,870,654 B2 | 10/2014 | Nakayama et al. |
| 8,882,596 B2 | 11/2014 | Shimamura et al. |
| 8,957,835 B2 | 2/2015 | Hoellwarth |
| 9,110,543 B1 | 8/2015 | Dabell |
| 9,111,005 B1 | 8/2015 | Ross et al. |
| 9,246,487 B2 | 1/2016 | Casparian et al. |
| 9,411,160 B2 | 8/2016 | Hosoya |
| D772,986 S | 11/2016 | Chen et al. |
| 9,678,566 B2* | 6/2017 | Webb ................. G06F 3/011 |
| 2001/0000888 A1 | 5/2001 | Armstrong |
| 2001/0008848 A1 | 7/2001 | Armstrong |
| 2001/0045938 A1 | 11/2001 | Willner et al. |
| 2002/0024503 A1 | 2/2002 | Armstrong |
| 2002/0058549 A1 | 5/2002 | Armstrong |
| 2003/0083131 A1 | 5/2003 | Armstrong |
| 2003/0100367 A1 | 5/2003 | Cooke |
| 2004/0222970 A1 | 11/2004 | Martinez et al. |
| 2005/0121031 A1 | 6/2005 | Ebersole, Jr. |
| 2005/0255915 A1 | 11/2005 | Riggs et al. |
| 2006/0028434 A1 | 2/2006 | Armstrong |
| 2006/0111180 A1 | 5/2006 | Cheng |
| 2006/0287089 A1 | 12/2006 | Addington et al. |
| 2007/0049374 A1 | 3/2007 | Ikeda et al. |
| 2007/0065638 A1 | 3/2007 | Wang et al. |
| 2007/0066394 A1 | 3/2007 | Ikeda et al. |
| 2007/0293318 A1 | 12/2007 | Tetterington et al. |
| 2008/0180390 A1 | 7/2008 | Yoshikawa |
| 2008/0261693 A1 | 10/2008 | Zalewski |
| 2008/0261695 A1 | 10/2008 | Coe |
| 2009/0005164 A1 | 1/2009 | Chang |
| 2009/0149256 A1 | 6/2009 | Lui |
| 2009/0298590 A1 | 12/2009 | Marks et al. |
| 2010/0045607 A1 | 2/2010 | Kuwaki et al. |
| 2010/0118195 A1 | 5/2010 | Eom et al. |
| 2010/0245239 A1 | 9/2010 | Sternberg |
| 2010/0253651 A1 | 10/2010 | Day |
| 2011/0118028 A1 | 5/2011 | Sobel et al. |
| 2011/0159959 A1 | 6/2011 | Mallinson et al. |
| 2011/0205161 A1 | 8/2011 | Myers et al. |
| 2011/0294579 A1 | 12/2011 | Marks et al. |
| 2012/0013571 A1 | 1/2012 | Yeh et al. |
| 2012/0050229 A1 | 3/2012 | Tenuta et al. |
| 2012/0088582 A1 | 4/2012 | Wu et al. |
| 2012/0193211 A1 | 8/2012 | Cisla et al. |
| 2012/0202597 A1 | 8/2012 | Yee et al. |
| 2012/0228111 A1 | 9/2012 | Peterson et al. |
| 2012/0306725 A1 | 12/2012 | Hilkes |
| 2012/0306802 A1 | 12/2012 | McCracken |
| 2013/0141382 A1 | 6/2013 | Simmons et al. |
| 2013/0324254 A1 | 12/2013 | Huang et al. |
| 2013/0335546 A1 | 12/2013 | Crane et al. |
| 2014/0015813 A1 | 1/2014 | Numaguchi et al. |
| 2014/0118257 A1 | 5/2014 | Baldwin |
| 2014/0141891 A1 | 5/2014 | Georgy |
| 2014/0152550 A1 | 6/2014 | Beall et al. |
| 2014/0224633 A1 | 8/2014 | Peterson et al. |
| 2014/0228124 A1 | 8/2014 | Plagge et al. |
| 2014/0273546 A1 | 9/2014 | Harmon et al. |
| 2014/0274372 A1 | 9/2014 | Rosander |
| 2014/0342830 A1* | 11/2014 | Musick, Jr. ........... G06F 3/0346 463/37 |
| 2014/0354305 A1 | 12/2014 | Hanssen et al. |
| 2014/0354577 A1 | 12/2014 | Hanssen et al. |
| 2014/0361977 A1 | 12/2014 | Stafford et al. |
| 2014/0362110 A1 | 12/2014 | Stafford |
| 2014/0364212 A1 | 12/2014 | Osman et al. |
| 2015/0015482 A1 | 1/2015 | Njolstad et al. |
| 2015/0070142 A1 | 3/2015 | Chen et al. |
| 2015/0094142 A1 | 4/2015 | Stafford |
| 2015/0116214 A1 | 4/2015 | Grunnet-Jepsen et al. |
| 2015/0119146 A1* | 4/2015 | Ikeda ..................... A63F 13/06 463/37 |
| 2015/0153869 A1 | 6/2015 | Kim et al. |
| 2015/0198864 A1 | 7/2015 | Hayskjold et al. |
| 2015/0234189 A1 | 8/2015 | Lyons |
| 2015/0234477 A1 | 8/2015 | Abovitz et al. |
| 2015/0258431 A1 | 9/2015 | Stafford et al. |
| 2015/0258432 A1 | 9/2015 | Stafford et al. |
| 2015/0286334 A1 | 10/2015 | Simmons et al. |
| 2015/0287381 A1 | 10/2015 | Kim et al. |
| 2015/0298363 A1 | 10/2015 | Kamiyama et al. |
| 2015/0370040 A1 | 12/2015 | Georgiev |
| 2016/0035136 A1 | 2/2016 | Sendai et al. |
| 2016/0187657 A1 | 6/2016 | Thomas |
| 2016/0274662 A1 | 9/2016 | Rimon et al. |
| 2016/0307332 A1 | 10/2016 | Ranjan et al. |
| 2016/0357249 A1 | 12/2016 | Webb et al. |
| 2016/0357261 A1 | 12/2016 | Bristol et al. |
| 2016/0361637 A1 | 12/2016 | Higgins et al. |
| 2016/0361638 A1 | 12/2016 | Higgins et al. |
| 2016/0363996 A1 | 12/2016 | Higgins et al. |

OTHER PUBLICATIONS

Allin, Notice of Allowance, U.S. Appl. No. 14/850,821, dated Jul. 5, 2017, 8 pgs.
Ben Lang, Sixense STEM Update, Nov. 27, 2013, from http://www.roadtovr.com/sixense-stem-update-pre-order-black-Friday-sale-prototype-colors/, 3 pgs.
Bristol, Office Action, U.S. Appl. No. 14/729,954, dated Jul. 10, 2017, 17 pgs.
"Capacitive Touch (Touch Sensing Technologies—Part 2)," published Jun. 10, 2011, accessed and printed from URL<https://web.archive.org/web/20111028165628/http://www.touchadvance.com/2011/06/capacitive-touch-touch-sensing.html>, 3 pgs.
Drinkwater, Office Action, U.S. Appl. No. 14/843,862, dated Jan. 27, 2017, 7 pgs.
Drinkwater, Final Office Action, U.S. Appl. No. 14/843,862, dated May 31, 2017, 12 pgs.
"Hands-On with Sixense STEM VR Motion-Tracking System," written by Tested, accessed and printed from URL <https://www.youtube.com/watch?v=C8z-On6FBTM>, 5 pgs.

(56) References Cited

OTHER PUBLICATIONS

Higgins, Office Action, U.S. Appl. No. 14/737,151, dated Mar. 9, 2017, 19 pgs.
Higgins, Notice of Allowance, U.S. Appl. No. 14/737,151, Aug. 4, 2017, 11 pgs.
Higgins, Office Action, U.S. Appl. No. 14/737,162, dated Jun. 2, 2017, 22 pgs.
Higgins, Office Action, U.S. Appl. No. 14/737,169, dated May 15, 2017, 26 pgs.
Higgins, Notice of Allowance, U.S. Appl. No. 14/737,185 dated Sep. 11, 2017, 12 pgs.
Kickstarter, STEM System: The Best Way to Interact with Virtual Worlds, Feb. 9, 2015, from https://www.kickstarter.com/projects/89577853/stem-system-the-best-way-to-interact-with-virtual-worlds, 10 pgs.
"Projected Capacitive Technology," published by 3M Touch Systems, on or before Dec. 31, 2013, accessed and printed from URL<http://multimedia.3m.com/mws/media/7884630/tech-brief-projected-capacitive-technolgy.pdf, 8 pgs.
"STEM System," accessed and printed from URL <https://sixense.com/wireless>, 5 pgs.
Tactical Haptics, Sneak Peek at New Reactive Grip Motion Controller, Oct. 11, 2013, from http://tacticalhaptics.com/new-reactive-grip-motion-controller/, 1 pg.
Webb, Office Action, U.S. Appl. No. 14/729,951, dated Jan. 4, 2017, 12 pgs.
Webb, Notice of Allowance, U.S. Appl. No. 14/729,951, dated Apr. 17, 2017, 8 pgs.

* cited by examiner

VIRTUAL REALITY SYSTEM WITH HEAD-MOUNTED DISPLAY, CAMERA AND HAND-HELD CONTROLLERS

TECHNICAL FIELD

This application relates generally to gaming entertainment and virtual-reality systems, and more specifically to virtual-reality systems having an image-capturing device capable of sensing or tracking movement of hand-held controllers in order to detect a user's hand movements.

BACKGROUND

Gaming entertainment systems typically include a hand-held controller, game controller, or other controller. A user manipulates the controller to send commands or other instructions to the gaming entertainment system to control a video game or other simulation. For example, the controller may be provided with several buttons or knobs operated by the user, such as a joystick. Each of the buttons or knobs corresponds to a desired action to be carried out on a display of the gaming entertainment or virtual-reality system. Other gaming and virtual-reality systems further provide virtual-reality gear such as 3D glasses or mats having motion sensors which the user steps on to track the user's feet to give the user a perception of being in virtual reality.

The action carried out on a display or screen of the virtual-reality or gaming system is limited to a representation of a general position of the user while on the mat. The user's physical hand motions such as punching, swinging, or waving and the like are not detectable by the mat, therefore these virtual-reality or gaming systems provide only a limited feeling of "reality" to the user.

SUMMARY

Accordingly, there is a need for virtual-reality or gaming systems having capability of tracking positions of hand-held controllers to simulate actual motion of a user holding the controller, thereby enhancing the user virtual-reality experience. This capability may be integrated with a head-mounted display (HMD), to reduce the number of components in such systems.

In accordance with some embodiments, a virtual-reality system includes a HMD, a forward-looking camera coupled to the HMD, and a hand-held controller communicatively (e.g., wirelessly) coupleable to the HMD. The hand-held controller includes a first user-input key, a grip, and an outward-facing surface coupled to the grip. The hand-held controller further includes a plurality of illumination sources coupled to (e.g., mounted on or embedded in) the outward-facing surface. The illumination sources are configured to provide light that is detectable by the camera.

In some embodiments, the forward-looking camera extends from a front surface of the HMD.

In some embodiments, the hand-held controller further includes a cage coupled to the grip. The outward-facing surface includes an outer surface of the cage. The plurality of illumination sources are coupled to the outer surface of the cage.

In some embodiments, at least a portion of the plurality of illumination sources are positioned to be detectable to the forward-looking camera when the HMD is worn by a user and the user holds the grip in a neutral position.

In some embodiments, the cage is configured to be positioned above a user's hand when the user holds the grip in the neutral position.

In some embodiments, the hand-held controller further includes a user-input surface that includes the first user-input key.

In some embodiments, the virtual-reality system further includes a structural web coupling the cage to the user-input surface.

In some embodiments, the virtual-reality system further includes a second user-input key. The second user-input key is a trigger mounted on at least one of the structural web and the grip at a position configured to be actuated by a middle finger of the user.

In some embodiments, the user-input surface forms an inner front surface of the cage.

In some embodiments, the grip is slanted at an angle with respect to the user-input surface.

In some embodiments, the user-input surface includes a plurality of user-input keys including the first user-input key. The user-input surface further includes a touch-sensitive surface partitioned into a plurality of sections where each section corresponds to a respective user-input key and includes at least one touch sensor to detect a touch on the corresponding section.

In some embodiments, the grip is integrally formed with the cage.

In some embodiments, the cage is detachably coupled to the grip.

In some embodiments, the plurality of illumination sources includes a plurality of light-emitting diodes (LEDs) and the forward-looking camera is configured to track light emitted by the LEDs.

In some embodiments, the plurality of LEDs includes a plurality of infrared LEDs and the forward-looking camera is configured to detect infrared light emitted by the infrared LEDs.

In some embodiments, the virtual-reality system further includes a first power source to supply power to the HMD and the forward-looking camera, and a second power source to supply power to the hand-held controller, including to the plurality of LEDs.

In some embodiments, the plurality of illumination sources includes a plurality of passive reflectors, and the camera includes an illumination source to provide light to the passive reflectors. The camera may also include a sensor to detect light reflected back to the camera by the passive reflectors.

In some embodiments, the first user-input key is selected from the group consisting of a thumbstick, a button, a trigger, and a directional pad. The button is selected from the group consisting of an A or X button, a B or Y button, a start button, a back button, a forward button, and a home button.

In some embodiments, the forward-looking camera is external to and electrically coupleable to the HMD.

In accordance with some embodiments, a virtual-reality system includes a head-mounted display (HMD), a forward-looking camera coupled to the HMD, and two hand-held controllers. Each of the hand-held controllers is communicatively (e.g., wirelessly) coupleable to the HMD and includes a respective user-input key, a respective grip, a respective outward-facing surface coupled to the respective grip, and a respective plurality of illumination sources coupled to the respective outward-facing surface and configured to provide light that is detectable by the camera.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DETAILED DESCRIPTION

Figure 1A:
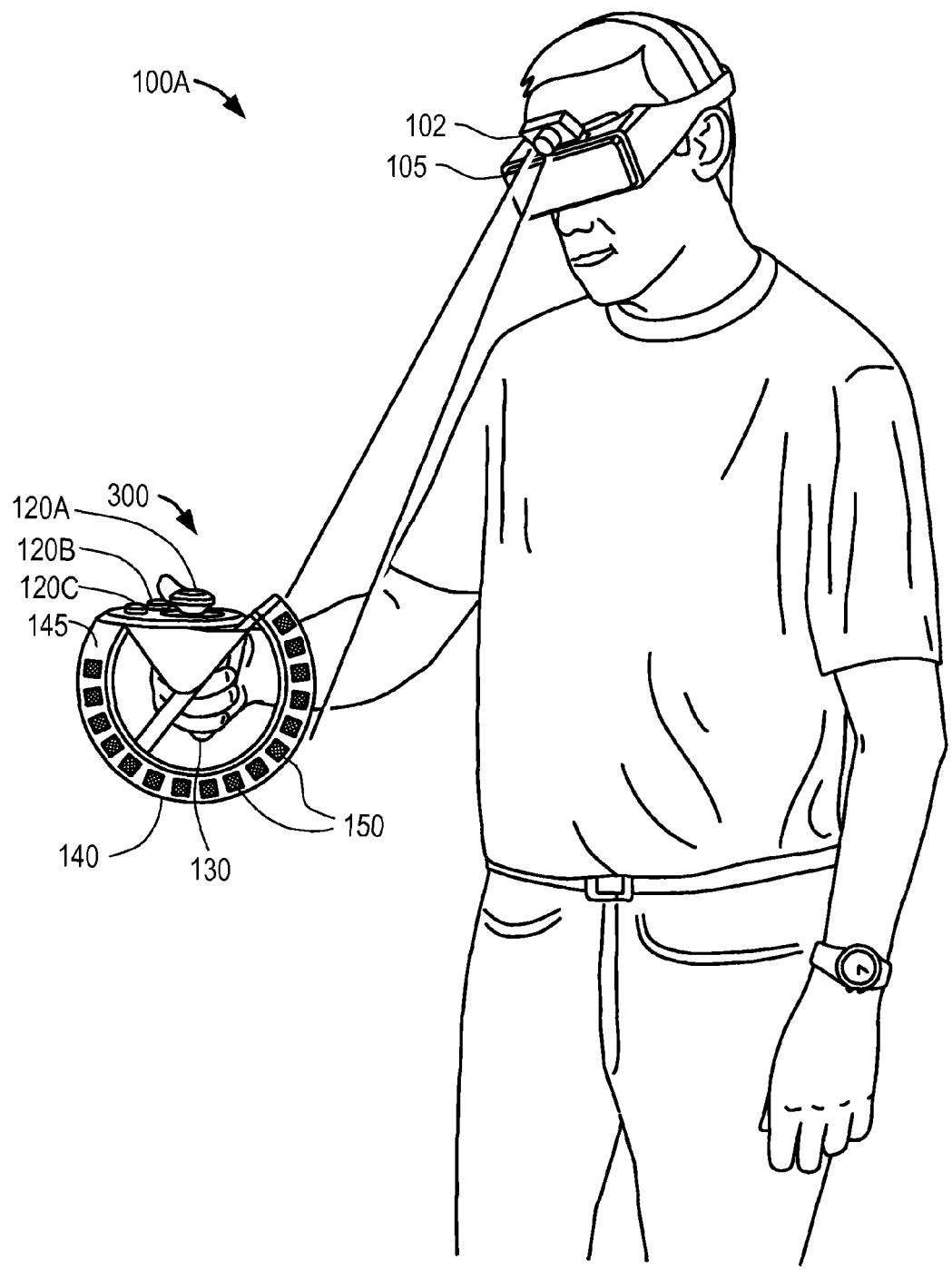
FIGS. 1A-1C illustrate exemplary virtual-reality systems including a front-looking camera extending from a head-mounted display (HMD) in accordance with some embodiments.

Virtual-reality or gaming systems may include hand-held controllers held in one or both hands by a user while playing a video game or carrying out some other virtual reality activity in order to operate the user-input keys (e.g., buttons, thumbstick, directional pad, trigger, etc.) on the controller. While playing the game or carrying out the virtual-reality activity, the user may become so immersed in the game as to move their hands in a manner mimicking a desired action (e.g., performed by pressing one of the buttons while holding the controller). For example, during playing a boxing game a user may press an "L" button corresponding to a left hand punch while simultaneously jerking their left hand for a more "real" sensation. It is desirable to display the hand motion of the user as a corresponding motion by an image subject on the screen in the virtual reality system.

Accordingly, the present invention describes virtual reality systems capable of detecting physical positions of hand-held controllers at various points in time to simulate actual hand movements of users holding the controllers to allow easy tracking of the user hand movements and enhance the user virtual-reality experience. The detected positions and movements of the hand-held controllers may be used as additional commands to control various aspects of the game or other simulation being played.

In some embodiments a virtual-reality system includes a head-mounted display (HMD), a forward-looking camera coupled to the HMD, and a hand-held controller communicatively coupleable to the HMD (e.g., such that it can communicate wirelessly with the HMD). The hand-held controller includes one or more user-input keys, a grip, an outward-facing surface coupled to the grip, and illumination sources coupled to (e.g., mounted on or embedded in) the outward-facing surface of the controller. The forward-looking camera is adapted to detect light reflected or emitted by the illumination sources. In some embodiments, the forward-looking camera is directly coupled to and extends from a front surface of the HMD. In other embodiments, the forward-looking camera is an external camera communicatively coupled to, but physically positioned separate from the HMD. The HMD uses the forward-looking camera to detect movement of the illumination sources by tracking positions of light reflected or emitted in order to model actions of the user's hand(s) in the virtual-reality system. The camera may detect various movements of the hand-held controller, such as punching movements, throwing movements, hitting movements when playing a sport, and the like. Motions of the hand-held controller correspond to various commands such that the motions are transferred into actions in the virtual reality system.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first user-input key could be termed a second user-input key, and, similarly, a second user-input key could be termed a first user-input key, without departing from the scope of the various described embodiments. The first user-input key and the second user-input key are both user-input keys, but they are not the same user-input key.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1B:
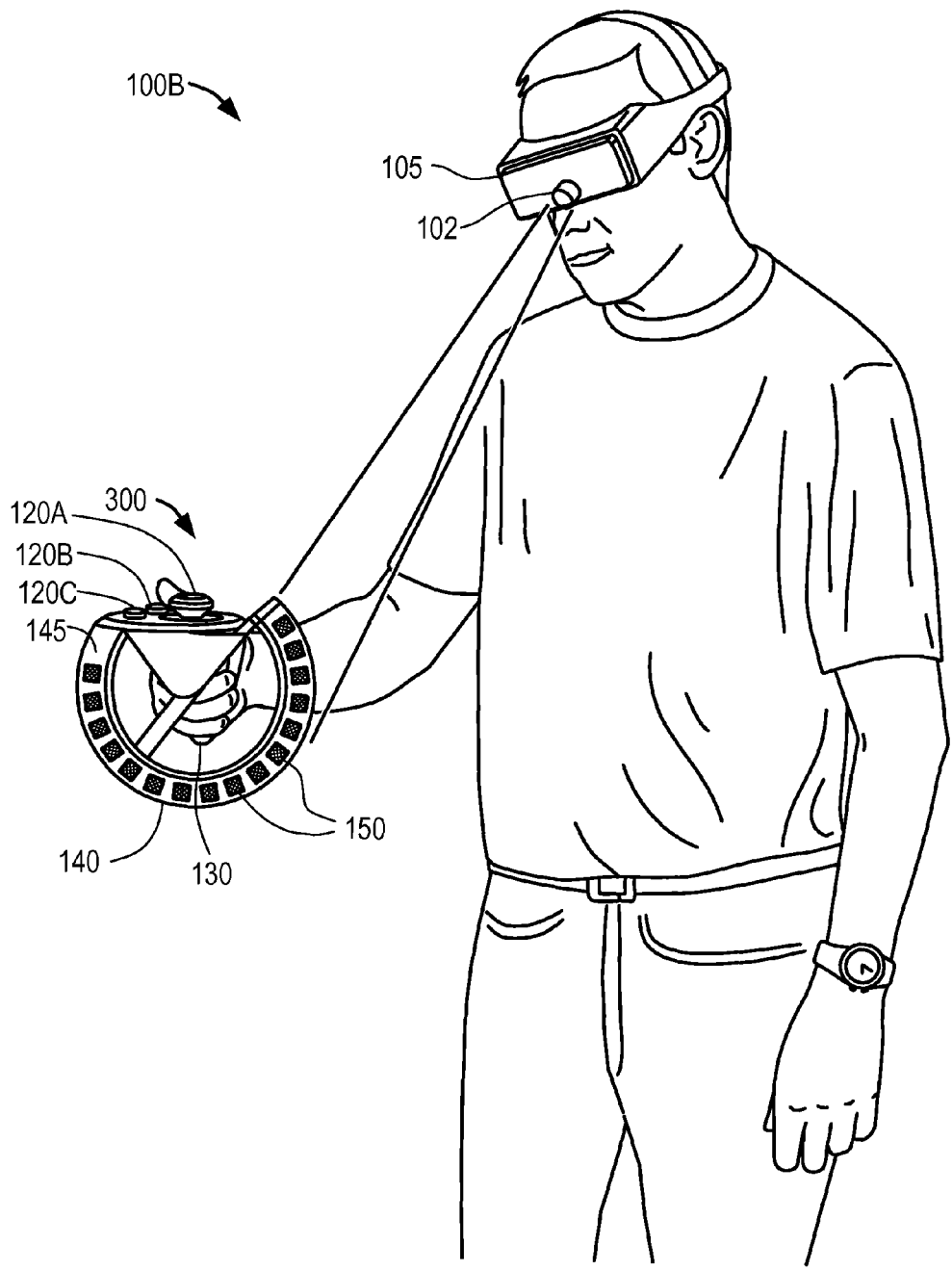

FIGS. 1A and 1B illustrate exemplary virtual reality systems 100A and 100B including a front-looking camera 102 coupled to (e.g., extending from) a head-mounted display (HMD) 105, and a hand-held controller 300 in accordance with some embodiments. The hand-held controller 300 generally comprises a first user-input key 120A, a grip 130, an outward-facing surface 145 coupled to the grip 130, and a plurality of illumination sources 150 coupled to (e.g., mounted on or embedded in) the outward-facing surface 145. The illumination sources 150 are configured to emit or reflect light that is detectable by camera 102. The camera 102 is positioned to detect movement in positions of the illumination sources 150 when the user makes a motion (e.g., waving, swinging, punching, shaking, or any other hand motion) while holding the grip 130 of the controller. By detecting a movement of the illumination sources 150 on the controller 300, the camera is able to capture sequential positions of the controller 300 over time, and thus allow motion of an image subject to be modeled in virtual reality based on actual physical motions made by the user (e.g., punching, swinging, etc) as described above. The HMD 105 is configured to display a view which shifts as a user shifts their head in a corresponding direction or tilts their head at an angle. The HMD 105 is communicatively coupleable to the controller 300 and the camera 102 so as to be able to display the detected motions of the controller 300 along with motions of the head of the user as those of an image subject of the virtual reality system 100. For example, the HMD 105 communicates wirelessly with the controller 300 and communicates with the camera 102 through a wired or wireless connection.

In some embodiments, as illustrated for the virtual-reality system 100A (FIG. 1A), the camera 102 extends from (e.g., is mounted to) the top of the HMD 105 (e.g., at a downward facing angle) such that the controller 300 having the plurality of illumination sources 150 is within view of the camera 102 when the user holds the grip 130 in a neutral position. Alternatively, the camera 102 extends from (e.g., is mounted to) a side of the HMD 105 or the bottom of the HMD 105. In these examples, the forward-looking camera 102 is external to and communicatively coupled or coupleable to the HMD 105 (e.g., through a wired connection with the HMD 105 or wirelessly). A neutral position refers to when users hold the controller 300 in front of them with the grip 130 between palm and fingers and otherwise relax their arms and wrists. The distance at which the camera 102 is extendable from the HMD 105 may be adjustable depending on how far away the user holds the controller 300 from the their body.

In some embodiments, as illustrated for the virtual-reality system 100B (FIG. 1B), the camera 102 extends from a front surface of the HMD 105. For example, a first portion of the camera 102 is in front of the HMD 105 while a second portion of the camera 102 is housed within the HMD 105. Extending the camera 102 from the front surface of the HMD 105 provides a wide (e.g., 180°) field of view for the camera 102. In still other embodiments, the camera is embedded entirely within the HMD 105 (e.g., with the lens exposed through a transparent portion of the front surface of the HMD 105).

The camera 102 may be configured with sensors to sense light emitted or reflected by the illumination sources 150. The camera 102 is configured to sense a position of the controller 300 or illumination sources 150 based on the light emitted. The camera 102 or HMD 105 thus may determine the position and orientation of the controller 300. In some embodiments, based on a distance of the controller 300 from the user's body, the camera 102 is adapted to either extend away from or retract towards the HMD. In some embodiments, an angle at which the camera faces the controller 102 is also similarly adjustable depending on orientation of the controller 300 and the plurality of illumination sources.

In some embodiments, forward facing camera 102 is positioned to detect the light emitted or reflected by the illumination sources 150 when the outward-facing surface 145 is positioned above the user's hand in the neutral position.

Figure 2:
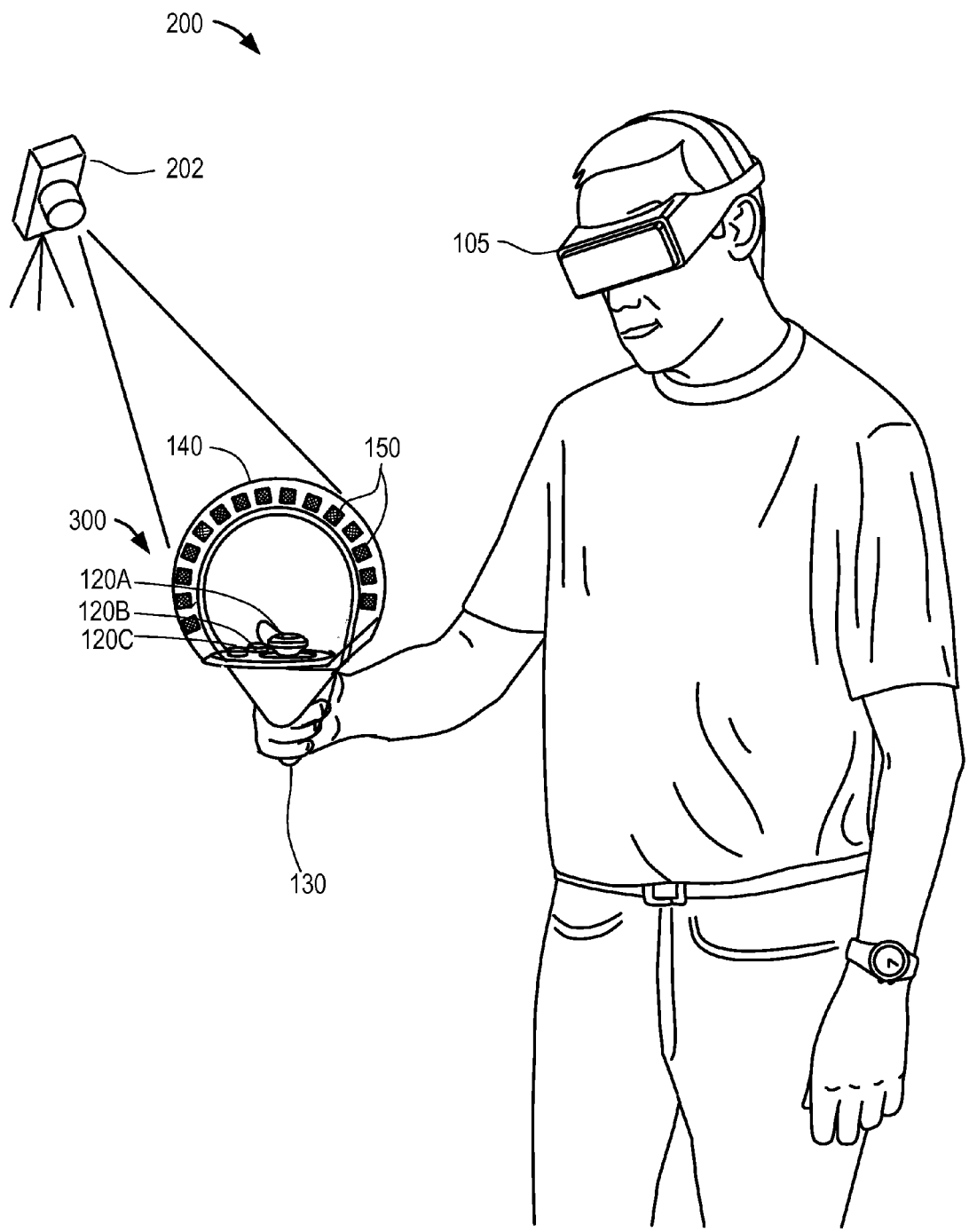
FIG. 2 illustrates an exemplary virtual-reality system including a head-mounted display and an external camera in accordance with some embodiments.

FIG. 2 illustrates an exemplary virtual-reality system 200 including a head-mounted display 105 and an external camera 202 in accordance with some embodiments. The camera 202 is external to and communicatively (e.g., wirelessly) coupleable to the HMD 105. Here, the camera 202 is positioned in front of the user and at least a portion of the illumination sources 150 are positioned to face away from the user so as to be visible or detectable to the external camera 202 when the user holds the grip 130 in the neutral position.

As described for the camera 102, the camera 202 detects movement of the illumination sources 150 when the user makes a motion (e.g., waving, swinging, punching, shaking, or any other hand motion) while holding the grip 130 of the controller. In some embodiments, as illustrated in FIG. 2, the outward-facing surface 145 is positioned such that it is located above the user hand when the user holds the grip 130 in the neutral position. Given this orientation, the outward-facing surface 145 is within the view of the external forward-looking camera 202 which is separate from the HMD 105.

In some embodiments, the camera 102, 202 may be customized for the purposes of the virtual reality system 100. In some embodiments, the camera 102, 202 may include but not be limited to a commercially available camera product of any type or brand, such as for example a web-cam, an IR capable camera, and/or a USB camera, etc.

In some embodiments, the camera 102, 202 is electrically connected to a power source which may or may not be the same power source providing power to the HMD 105. The camera 102, 202 and the HMD 105 may be wireless; therefore, the power source may be one or more batteries.

In some embodiments, the illumination sources 150 are positioned to allow the camera 102, 202 to detect at least six degrees of freedom of the controller 102. The six degrees of freedom are the controller's 300 position within x, y and z coordinates of space and the controller's 300 orientation—which includes the controller's 300 yaw, pitch and roll. The six degrees of freedom detected by the camera 102 are used to determine the user's movements of the controller 300 and model these movements in virtual reality.

In some embodiments, the illumination sources 150 are light-emitting diodes (LEDs). In some embodiments, the LEDs 150 are infrared (IR) LEDs. The camera 102 is configured to detect the IR light emitted by the IR LEDs on the controller 300 and record the signals sensed from the emitted light to determine the position and orientation of the controller 300.

In some embodiments, the LEDs may be positioned on the outward-facing surface 145 of the controller 300 in any suitable pattern, order, or array. In some embodiments, the outward-facing surface 145 is an outer surface of a cage 140 coupled to the grip 130. The LEDs may be fixedly or detachably positioned on, and thus coupled to, the cage 140 by any appropriate method. For example, the LED's may be mounted on or embedded within the outer surface 145 of the cage 140. Alternatively, the LEDs may be on a sleeve that surrounds the cage 140 and effectively forms the outer surface 145 of the cage 140. Although the LEDs are described as being positioned on the outer 145 surface of the cage 140, they may additionally or alternatively be coupled to any other surface on the cage 140 and/or the rest of the controller 300.

The LEDs are electrically connected to a power source which may or may not be same power source providing power to the controller 300. The controller 300 may be wireless; therefore, the power source may be one or more batteries. The LEDs may be housed in diffused cases including a current limiting resistor to keep the current from the power source to the LED below the LED's maximum current rating so as to ensure maximum life of the LEDs. The LEDs may be activated when a suitable voltage is applied. By virtue of the LEDs being positioned in an area on the controller 300 detectable to the camera 102, 202, motion of the light produced by the LEDs that is detected by the camera 102, 202 is used as an indication of the positions and motion of the controller 300. In this way, motion of the controller is tracked by the camera 102, 202, allowing for corresponding virtual-reality hand motions to be shown on the HMD 105. For example, when the user makes a punching motion while playing a boxing game, movement of the LEDs in a manner corresponding to a punch may be detected and used to model the user's motion for the image subject displayed on the HMD 105 in the virtual reality system 100. In this way, the present invention provides the advantage of enhancing the virtual reality experience for the user by adding the additional element of hand motions to the image subject.

Figure 1C:
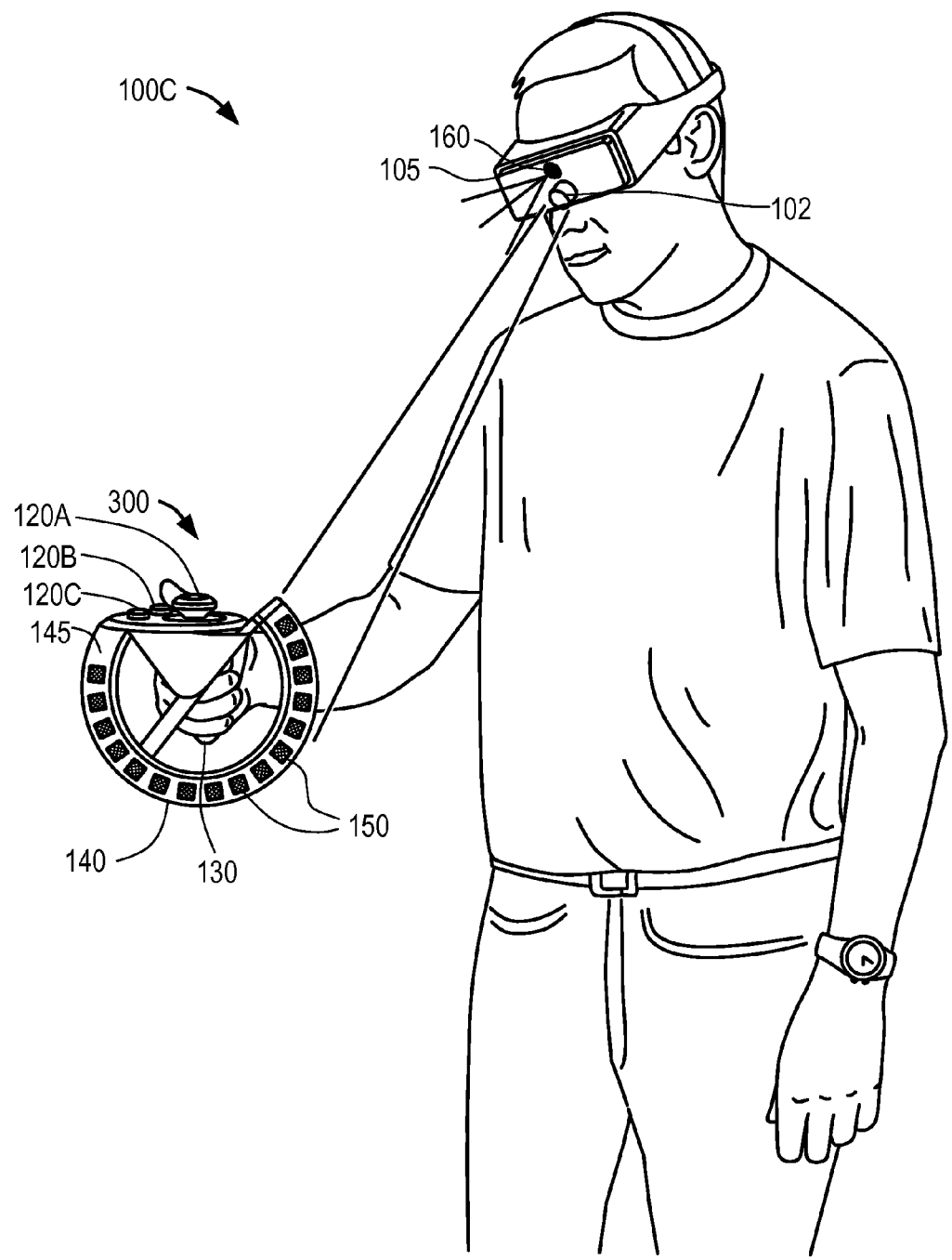

In some embodiments, the illumination sources 150 are passive reflectors. In some embodiments, the camera 102, 202 is adapted to include an illumination source (e.g., a flash) and to provide light to the passive reflectors. For example, FIG. 1C shows a virtual-reality system 100C in which the camera 102 includes an illumination source (e.g., a flash) 160. (The illumination source may be directly connected to the rest of the camera 102 or may be separate from the rest of the camera 102. The illumination source may be considered part of the camera 102 or may be considered a separate component of the virtual-reality system.) The illumination source 160 may be integrated into the HMD 160 (e.g., such that it provides illumination through a transparent portion of the front surface of the HMD 160), mounted on the HMD 160 (e.g., on the top, bottom or side of the HMD 160) or separate from the HMD 160. In the example of FIG. 2, an illumination source may be integrated in the camera 202, mounted on the camera 202, or separate from the camera 202. The passive reflectors receive light (e.g., from the illumination source 160) and reflect the light back in the direction of the camera 102, 202. The camera 102. 202 includes a sensor to detect the light reflected back by the passive reflectors and record the signals sensed from the reflected light to determine the position and orientation of the controller 300.

In some embodiments, the controller 300 includes the first user-input key 120A and may include one or more additional user-input keys 120B, 120C. A user-input key is a button, knob, switch, thumbstick, directional pad, or any other such part that a user presses or manipulates in some other way to carry out a specific action in a virtual reality system (e.g., during gaming).

Figure 3A:
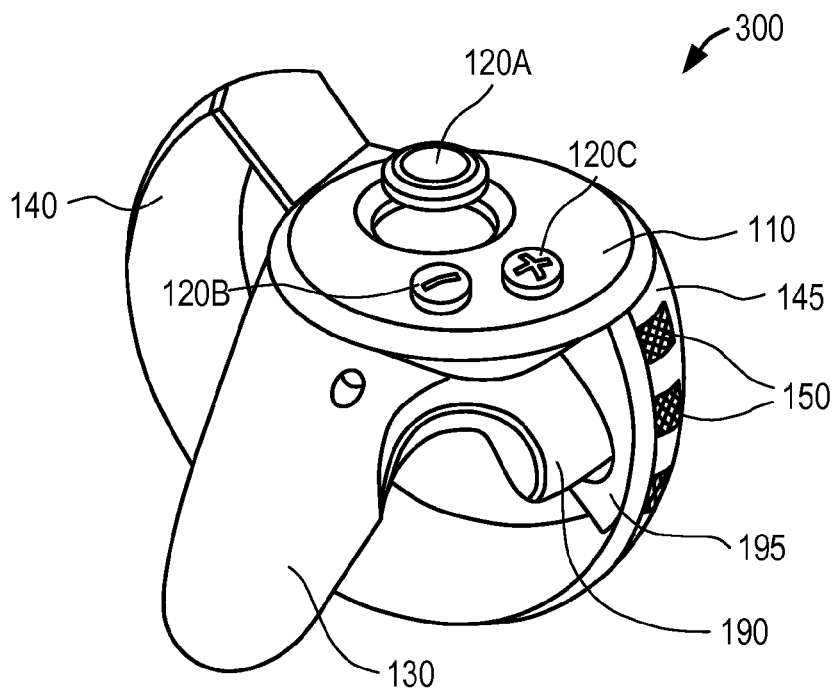
FIG. 3A and FIG. 3B illustrate isometric views of a hand-held controller of the exemplary virtual-reality system in accordance with some embodiments.
Figure 3B:
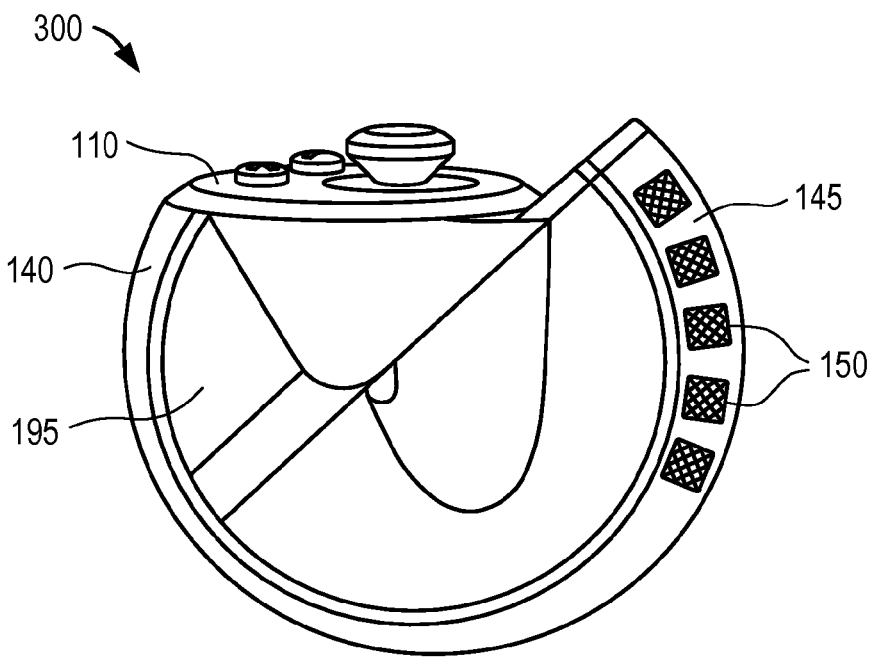

FIG. 3A and FIG. 3B illustrate isometric views of a hand-held controller 300 of the exemplary virtual reality system 100 in accordance with some embodiments. In some embodiments, the first user-input key 120A may be selected from the group consisting of a thumbstick, a button, a trigger, and a directional pad. In some embodiments, the first user-input key 120A may be the button selected from the group consisting of an A or X button, a B or Y button, a start button, a back button, a forward button, and a home button. The A or B buttons may correspond to a selection action between at least two choices presented to the user in the gaming system. The X or Y button may correspond to a negative or affirmative decision to be made by the user dictating how the image subject will proceed in the game. X may correspond to an action of "NO" or "END" and Y may correspond to "YES" or "PROCEED/CONTINUE." The start button may be a button activated by the user to begin the virtual-reality (e.g., gaming) experience, and the back and forward buttons may indicate a direction in which the user desires the image subject to move. The home button may be a button activated to return the gaming experience back to a main menu or to start the game or activity from the beginning.

In some embodiments, the hand-held controller 300 further comprises a user-input surface 110 that includes the first user-input key 120A. The user-input surface 110 includes a plurality of user-input keys 120A, 120B and 120C. Alternatively, the user-input surface includes a single user-input key. In the example of FIGS. 1A-1C, FIG. 2, and FIGS. 3A and 3B, the user input keys include a thumbstick 120A and buttons 120B and 120C. Thus, the user-input surface 110 is a surface on the controller 300 where the user delivers an input by activating one or more user-input keys (e.g., by pressing a button or pushing a knob) corresponding to an action that the user desires to carry out in the virtual-reality system 100 (e.g., the virtual reality system 100A, 100B, or 100C).

Each of the user-input keys 120A, 120B and 120C is configured to communicate with the virtual-reality system 100 so as to translate an operation of the corresponding user-input key by the user into a corresponding action of the image subject displayed on the HMD 105 of the virtual reality system 100.

In some embodiments, the user-input surface 110 includes a plurality of user-input keys including the first user-input key 120A, and respective user-input keys 120B, 120C of the plurality of user-input keys are selected from a group consisting of a thumbstick, a button, a trigger, and a directional pad.

In some embodiments, a home button is positioned further away from the other user-input keys. This configuration would allow for user-input keys that are used most (e.g. a directional pad used to dictate a direction of movement of the image subject, e.g., up-down-left-right) to be placed closer to the vicinity of the fingers and thumb. This configuration provides the advantage that the user would need to reach less to press the more frequently used user-input keys, thereby mitigating the possibility of ergonomic ailments associated with overreaching and overstretching fingers.

Figure 4:
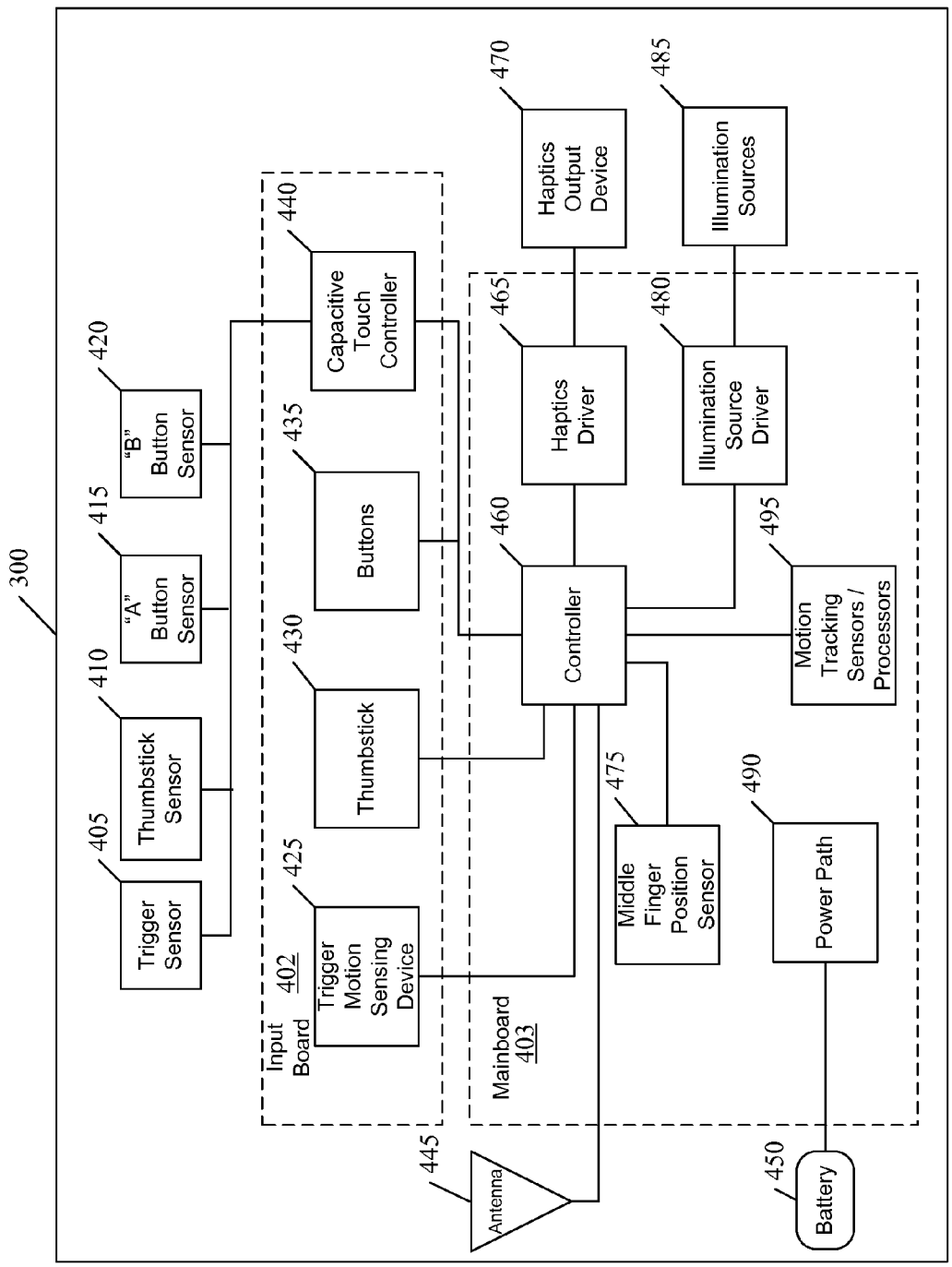
FIG. 4 is a block diagram illustrating an electrical configuration of the exemplary virtual-reality system in accordance with some embodiments.

In some embodiments, at least a portion of the user-input surface 110 is a touch-sensitive surface partitioned into a plurality of sections. Each section corresponds to a respective user-input key of the plurality of user-input keys. In this configuration, at least one touch sensor is positioned on a bottom surface of the user-input surface 110, as illustrated in FIG. 4, to detect a touch on the corresponding section. When a touch of a key by the user is detected by the sensors, the action associated with the corresponding user-input key touched is translated to an action of the subject image in the virtual reality system.

In some embodiments, the grip 130 is coupled to the user-input surface 110. The grip 130 is a protruding structure of the controller 300 which the user grips in one hand to hold the controller 300. This configuration allows for the user to be able to grip the controller 300 between a palm and fingers (e.g., three or less fingers) while freeing up the thumb and, in some embodiments, another finger (e.g. the middle finger), for operating the user-input keys 120A, 120B and 120C. In some embodiments, the middle finger is freed to operate a trigger 190 mounted at least in part on the grip 130 as shall be described below.

In some embodiments the grip 130 is a separate part of the controller 300 that is removably coupled to the user input surface 110 and/or cage 140. The grip 130 and the user-input surface may be coupled by a method appropriate for their materials of construction. For example, the grip and user-input surface 110 may be formed of a hard plastic and may be coupled to each other by ultrasonic welding. Alternatively, the grip 130 and the user-input surface 110 may be coupled to each other by a fastening mechanism such as a screw or a bolt, or may be threadedly engaged with each other.

In some embodiments, the grip 130 is integrally formed with the user-input surface 110 and/or the cage 140, as one part (e.g., which may be formed from molding).

In some embodiments, the grip 130 is slanted at a predetermined angle with respect to the user-input surface 110 (e.g., with a plane through the user-input surface or a portion thereof) in order to provide a comfortable (e.g., optimum) ergonomic balance for a user between holding the grip in and using a thumb to operate the at least one user-input key.

In some embodiments, the cage 140 is coupled to the user-input surface 110. The cage 140, which may also be referred to as a tracking cage, has the outer surface 145 on which the plurality of illumination sources 150 is positioned.

In the example of FIGS. 1A-1C and 3A-3B, the user-input surface 110 is outward-facing with respect to the cage 140. Alternatively, the user-input surface 110 may be inward-facing with respect to the cage 140, as illustrated in FIG. 2. For example, in some embodiments the user-input surface 110 forms an inner front surface of the cage 140 or is contiguous with the inner surface of the cage 140.

In some embodiments, the grip 130 and/or cage 140 may be formed of an over-molded rubber material (e.g., so as to provide a surface providing sufficient friction with a user's palm thus improving the grip). In some embodiments, the grip 130 and/or cage 140 may be formed of a hard plastic, including, but not limited to high density polyethylene providing increased rigidity in structure. Additionally, any other suitable materials may be used.

In some embodiments, the cage 140 may be detachably coupled to at least one of the user-input surface 110 and the grip 130. The cage 140 may be slidably coupled to the user-input surface 110 through a protrusion spanning a width of each end portion of the cage 140 being slidably engaged with a corresponding groove positioned on an outer circumference of the user-input surface 110. The cage 140 may be coupled to the grip 130 through a fastening mechanism such as a bolt, a screw or the like. The detachable configuration of the cage 140 to the grip 130 or the user-input surface 110 yields the advantage of separating the aforementioned components for calibration as necessary. Detachable coupling of the components also allows for a separate and potentially cheaper manufacturing process of the parts. Furthermore, detachable coupling of the cage 140 to at least one of the user-input surface 110 and the grip 130 allows for separation thereof upon dropping of the controller 300, thereby reducing the need to replace the entire unit upon damage, but instead focus on fixing/replacing the separate damaged part.

In some embodiments, as illustrated in FIGS. 3A and 3B, the controller 300 may further comprise a structural web 195 coupling the cage 140 to the user-input surface 110. The large structural web 195 provides further rigidity in structure to the coupling between the cage 140 and the user-input surface 110 to mitigate damage and separation of these components upon dropping of the controller 300 by the user.

In some embodiments, a trigger 190 is mounted at least in part on the structural web 195. That is, the trigger 190 may be mounted between the structural web 190 and the grip 130. This configuration yields the advantage that the trigger is positioned adjacent to a location of a user's finger (e.g., middle finger) when the grip 130 is held in the neutral position. In some embodiments, the trigger may be both pushed and pulled by the middle finger, thus providing increased control in manipulating the trigger to achieve a desired action. The trigger 190 is an example of a user-input key.

FIG. 4 is a block diagram illustrating an electrical configuration of an exemplary hand-held controller 300 in accordance with some embodiments. The hand-held controller 300 includes an input board 402 and a main board 403 coupled to the input board 402. The input board 402 includes a trigger motion sensing device 425, a thumbstick 430, buttons 435, and a capacitive touch controller 440. In other examples, the input board 402 may include additional or alternative user-input keys. The trigger motion sensing device 425 detects user activation of a trigger (e.g., trigger 190).

The capacitive touch controller 440 is coupled to multiple sensors such that the input board 402 receives sensed signals from capacitive sensors resulting from a user's touch. For example, the capacitive sensors include a trigger sensor 405, a thumbstick sensor 410, an "A" button sensor 415, and/or a "B" button sensor 420. For example, the trigger sensor 405 may sense when a user touches the trigger. Similarly, the thumbstick sensor 410 senses a signal resulting from the user touching the thumbstick 410. Further, the button sensors 415 and 420 sense signals resulting from the user touching the buttons 415 and 420. Other capacitive sensors may be included for other user-input keys (e.g., a directional pad).

The mainboard 403 includes a controller 460, a haptics driver 465, a middle finger position sensor 475, power path 490, motion tracking sensors/processors 495 and an illumination source driver 480. The haptics driver 465 drives a haptics output device 470 that provides haptic effects. An example of the haptics output device 470 includes a short vibration feedback device that, when activated, causes the hand-held controller 300 to vibrate.

The mainboard 403 may be coupled to an antenna 445 to wirelessly receive and transmit signals. The hand-held controller (e.g., controller 300) thus may be wireless. The mainboard 403 may also be coupled to a power source (e.g., a battery 450) to provide power supply to the hand-held controller. The power may be supplied to the mainboard 403, and also to the input board 402, through a power path 490.

The illumination source driver 480 (e.g., LED driver) drives illumination sources 485 (e.g., LEDs on the outer surface of the cage 140) under the control of the controller 460, and thus turns the illumination sources 485 on or off.

The middle finger position sensor 475 senses a position of the middle finger (e.g. when a user activates the trigger 190) and this information is processed by the controller 460. The motion tracking sensors/processors 495 include a plurality of motion sensors (e.g. accelerometers and/or gyroscopes) which tracks motion of the controller based on motions made by the user.

The camera 102, 202 includes at least one sensor for sensing light emitted or reflected from the plurality of illumination sources (e.g., LEDs or passive reflectors) and a controller for processing the light images received for the illumination sources 485 to detect positions of the controller over time.

In some embodiments, the HMD includes at least one sensor to sense signals from the controller 460 and a controller to process these signals into images displayed on the HMD. The processor of the HMD may further be configured to process information received from the camera 102, 202 relating to positions of the hand-held controller 300 for display on the HMD.

Figure 5A:
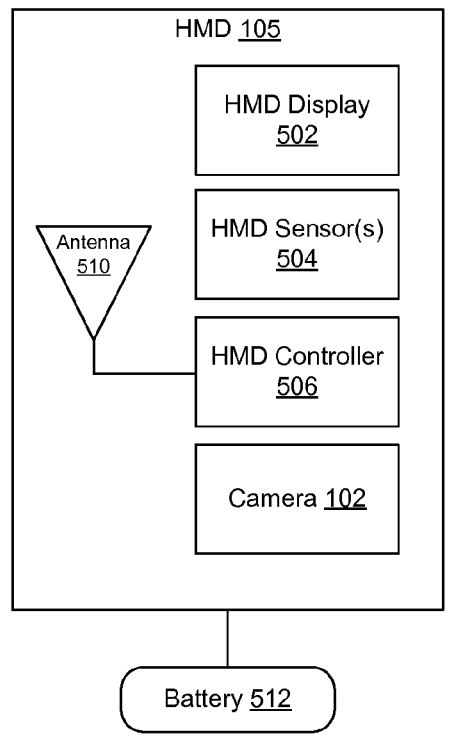
FIG. 5A is a block diagram of an exemplary head-mounted display in accordance with some embodiments.

FIG. 5A is a block diagram of an exemplary HMD 105 in accordance with some embodiments. The HMD 105 includes an HMD 502, one or more sensors 504, a controller 506, and a camera 102. The controller 506 is coupled to an antenna 510 for wireless communication (e.g., with hand-held controllers 300). The HMD 105 (e.g., including the camera 102) is powered by a battery 512.

Figure 5B:
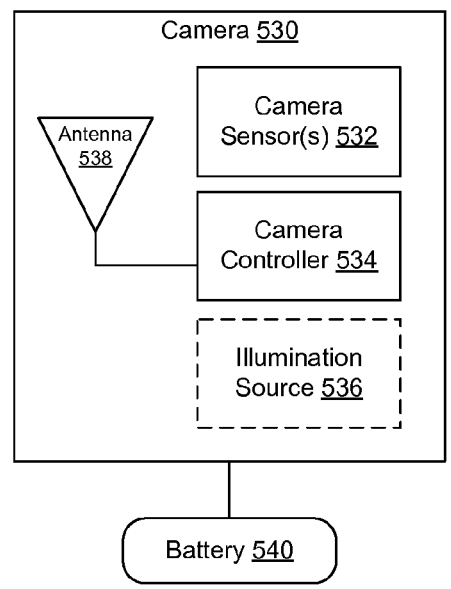
FIG. 5B is a block diagram of an exemplary camera in accordance with some embodiments.

FIG. 5B is a block diagram of an exemplary camera 530 in accordance with some embodiments. The camera 530 is an example of a camera 102 or 202. The camera 530 includes sensor(s) 532, a controller 534, and an optional illumination source (e.g., flash) 536. The controller 534 is coupled to an antenna 538 for wireless communication (e.g., with an HMD 105 and/or hand-held controllers 300). The camera 530 is powered by a battery 540; alternatively, the camera 530 is powered by a battery it shares with the HMD 105 (e.g., battery 512, FIG. 5A).

Some embodiments are directed to two hand-held controllers 300—one to be held in each of a user's hands. In some embodiments, the two controllers 300 may be identical, but for a position of at least one of the user-input keys, so as to be adapted specifically for either a left or right hand in which the controller is to be held. The first controller thus may be a right-handed controller and the second controller may be a left-handed controller. In other embodiments, the two controllers may be agnostic with respect to handedness (e.g., with both controllers having the same configuration of user-input keys, or with one controller having a configuration of user-input keys different than the other).

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A virtual-reality system comprising:
a head-mounted display (HMD);
a forward-looking camera coupled to the HIVID; and
a hand-held controller communicatively coupleable to the HIVID, the hand-held controller comprising:
a first user-input key;
a grip;
an outward-facing surface coupled to the grip; and
a plurality of illumination sources coupled to the outward-facing surface and configured to provide light that is detectable by the camera.

2. The virtual-reality system of claim 1, wherein the forward-looking camera extends from a front surface of the HMD.

3. The virtual-reality system of claim 1, wherein:
the hand-held controller further comprises a cage coupled to the grip;
the outward-facing surface comprises an outer surface of the cage; and
the plurality of illumination sources are coupled to the outer surface of the cage.

4. The virtual-reality system of claim 3, wherein at least a portion of the plurality of illumination sources are positioned to be detectable to the forward-looking camera when the HIVID is worn by a user and the user holds the grip in a neutral position.

5. The virtual-reality system of claim 4, wherein the cage is configured to be positioned above a user's hand when the user holds the grip in the neutral position.

6. The virtual-reality system of claim 3, wherein the hand-held controller further comprises a user-input surface that includes the first user-input key.

7. The virtual-reality system of claim 6, further comprising a structural web coupling the cage to the user-input surface.

8. The virtual-reality system of claim 7, further comprising a second user-input key, wherein the second user-input key is a trigger mounted on at least one of the structural web and the grip at a position configured to be actuated by a middle finger of the user.

9. The virtual-reality system of claim 6, wherein the user-input surface forms an inner front surface of the cage.

10. The virtual-reality system of claim 6, wherein the grip is slanted at an angle with respect to the user-input surface.

11. The virtual-reality system of claim 6, wherein:
the user-input surface comprises a plurality of user-input keys including the first user-input key, and
the user-input surface comprises a touch-sensitive surface partitioned into a plurality of sections, each section corresponding to a respective user-input key of the plurality of user-input keys and including at least one touch sensor to detect a touch on the corresponding section.

12. The virtual-reality system of claim 3, wherein the grip is integrally formed with the cage.

13. The virtual-reality system of claim 3, wherein the cage is detachably coupled to the grip.

14. The virtual-reality system of claim 1, wherein:
the plurality of illumination sources comprises a plurality of light-emitting diodes (LEDs); and
the forward-looking camera is configured to track light emitted by the LEDs.

15. The virtual-reality system of claim 14, wherein:
the plurality of LEDs comprises a plurality of infrared LEDs; and
the forward-looking camera is configured to detect infrared light emitted by the infrared LEDs.

16. The virtual-reality system of claim 14, further comprising:
a first power source to supply power to the HMD and the forward-looking camera; and
a second power source to supply power to the hand-held controller, including to the plurality of LEDs.

17. The virtual-reality system of claim 1, wherein:
the plurality of illumination sources comprises a plurality of passive reflectors; and
the camera comprises an illumination source to provide light to the passive reflectors and a sensor to detect light reflected back to the camera by the passive reflectors.

18. The virtual-reality system of claim 1, wherein the first user-input key is selected from the group consisting of a thumbstick, a button, a trigger, and a directional pad, and the button is selected from the group consisting of an A or X button, a B or Y button, a start button, a back button, a forward button, and a home button.

19. The virtual-reality system of claim 1, wherein the forward-looking camera is external to and electrically coupleable to the HMD.

20. A virtual-reality system comprising:
a head-mounted display (HMD);
a forward-looking camera coupled to the HMD; and
two hand-held controllers, each communicatively coupleable to the HMD, and each comprising:

a respective user-input key;
a respective grip;
a respective outward-facing surface coupled to the respective grip; and
a respective plurality of illumination sources coupled to the respective outward-facing surface and configured to provide light that is detectable by the camera.

\* \* \* \* \*

UNITED STATES PATENT AND TRADEMARK OFFICE
CERTIFICATE OF CORRECTION

PATENT NO. : 9,898,091 B2  
APPLICATION NO. : 14/729954  
DATED : February 20, 2018  
INVENTOR(S) : Bristol et al.

Page 1 of 1

It is certified that error appears in the above-identified patent and that said Letters Patent is hereby corrected as shown below:

In the Claims

Claim 1, Column 11, Line 44, please delete "the HIVID;" and insert --the HMD;--;

Claim 1, Column 11, Line 46, please delete "HIVID, the" and insert --HMD, the--;

Claim 4, Column 11, Line 66, please delete "the HIVID is" and insert --the HMD is--.

Signed and Sealed this  
Seventeenth Day of April, 2018

Andrei Iancu  
*Director of the United States Patent and Trademark Office*